US007966120B2

(12) United States Patent
Sasaki

(10) Patent No.: US 7,966,120 B2
(45) Date of Patent: Jun. 21, 2011

(54) ENGINE CONTROL SYSTEM AND VEHICLE INCLUDING THE SAME

(75) Inventor: Yuichi Sasaki, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 384 days.

(21) Appl. No.: 12/352,395

(22) Filed: Jan. 12, 2009

(65) Prior Publication Data

US 2009/0192697 A1 Jul. 30, 2009

(30) Foreign Application Priority Data

Jan. 25, 2008 (JP) ................................. 2008-015224

(51) Int. Cl.
*G06F 19/00* (2011.01)
*F02P 1/00* (2006.01)

(52) U.S. Cl. ..... 701/103; 701/105; 123/599; 123/149 A; 123/149 F

(58) Field of Classification Search ............. 123/406.13, 123/406.53, 406.56, 598, 599, 618, 149 R, 123/149 A, 149 D, 149 F; 701/101-105, 701/110, 113, 114; 290/40 R, 40 A, 40 B, 290/40 C, 41

See application file for complete search history.

(56) References Cited

U.S. PATENT DOCUMENTS

| | | | | | |
|---|---|---|---|---|---|
| 3,213,840 | A | * | 10/1965 | Corfield et al. | 123/599 |
| 3,768,455 | A | * | 10/1973 | Imhof | 123/406.56 |
| 3,963,015 | A | * | 6/1976 | Haubner et al. | 123/149 D |
| 4,249,506 | A | * | 2/1981 | Tada | 123/618 |
| 4,441,478 | A | * | 4/1984 | Fujimoto | 123/406.57 |
| 4,457,285 | A | * | 7/1984 | Hamai et al. | 123/598 |
| 4,817,577 | A | * | 4/1989 | Dykstra | 123/406.56 |
| 5,123,390 | A | * | 6/1992 | Okuda | 123/406.53 |
| 5,703,410 | A | * | 12/1997 | Maekawa | 123/339.16 |
| 6,114,775 | A | * | 9/2000 | Chung et al. | 307/10.1 |
| 2007/0028881 | A1 | * | 2/2007 | Nakata et al. | 123/179.15 |
| 2009/0198436 | A1 | * | 8/2009 | Sasaki | 701/103 |

FOREIGN PATENT DOCUMENTS

JP 2002-13459 A 1/2002

* cited by examiner

*Primary Examiner* — Willis R Wolfe, Jr.

(74) *Attorney, Agent, or Firm* — Dickstein Shapiro LLP

(57) ABSTRACT

A control system for an engine includes a regulator with an output waveform which includes a plurality of waves, each wave having a peak portion, a first portion located on a front side of the peak portion, and a second portion located on the other side of the peak portion, the second portion exhibiting a more rapid change in voltage than the first portion. An ECU is configured to turn on a fuel injector of the engine at a first timing and turn off an ignition plug of the engine at a second timing, the first and second timings corresponding to a shift in waveform output from the peak portion toward the first portion of a first wave and a second wave, respectively. The waveform shift corresponds to a predetermined angular shift in the rotational position of a crankshaft of the motorcycle engine of preferably about 3°.

23 Claims, 7 Drawing Sheets

ENGINE CONTROL SYSTEM AND VEHICLE INCLUDING THE SAME

PRIORITY INFORMATION

This patent application is based on and claims priority under 35 U.S.C. §119 to Japanese Patent Application No. 2008-015224, filed on Jan. 25, 2008, the entire contents of which is hereby expressly incorporated by reference.

TECHNICAL FIELD

The present invention relates to engine control systems and vehicles including engine control systems, and more particularly to engine control systems including a rectifier and vehicles including such engine control systems.

BACKGROUND

There is conventionally known an engine control system and a vehicle including the engine control system (see, for example, Japanese Patent Publication 2002-013459). The Japanese Patent Publication discloses a method and a system (engine control system) for controlling the ignition of an engine including an alternating current (AC) generator (power generating unit) driven by rotating a crankshaft, a regulator (rectifier) half-wave rectifying a voltage output from the AC generator, an ignition plug, an ignition coil (an operational load) to which current is supplied by the regulator, and an ignition system controlling supply and cutoff of current to the ignition coil. With this engine igniting method, the ignition plug is configured to give off sparks by generating high voltage using a change in the current when the current to be supplied to the ignition coil is cut off. Furthermore, the voltage output by the regulator is obtained by half-wave rectifying the voltage from the AC generator. A waveform of the voltage output from this regulator has an angular shape including a part having a larger change in the amount of the voltage and a part having a small change in the amount of the voltage. Furthermore, the ignition system is configured to control the ignition coil to give off sparks by generating high voltage having current change by cutting off the supply of current to the ignition coil when the waveform of the voltage output from the regulator reaches a peak portion.

However, the teachings of Japanese Patent Publication 2002-013459 do not take account a number of problems. When the waveform of the voltage output by the regulator (rectifier) reaches the peak portion, the ignition system cuts off the supply of current to the ignition coil (load). Due to this, the ignition system often controls cutoff of the supply of current to the ignition coil at a timing shifted from the timing at which the waveform of the voltage output from the regulator reaches the peak due to manufacturing error such as irregular polarization of a permanent magnet of the AC generator (power generating unit). In this case, if the ignition system controls the cutoff of the supply of current to the ignition coil at a timing shifted toward the timing at which the waveform of the voltage output from the regulator reaches the part having the large change in the amount of the voltage, the ignition system executes control of the cutoff of the supply of current to the ignition coil in a state in which the voltage output from the regulator is low. In this case, the change in the amount of the current at the time of the cutoff of the supply of current to the ignition coil is small. Due to this, the necessary voltage for the ignition plug to give off sparks may not be able to be obtained. As a result, the ignition performance of the ignition plug deteriorates, so that operation of the ignition plug (load) may become unstable.

SUMMARY

The present invention has been made to solve, or at least ameliorate, the above-described problems. To this end, one object of the present patent document is to provide an engine control system capable of reducing the likelihood an operational load will become unstable and a vehicle including the engine control system. Other objects, features, and advantages will become apparent from the following description taken together with the drawings.

To attain the above object, according to a first aspect, an engine control system for an engine including a crankshaft is provided. In one embodiment, the control system comprises a power generating unit arranged to be driven by the crankshaft, a load electrically coupled to the power generating unit, a control module configured to control the operation of the load, and a rectifier electrically interposed between the power generating unit and the load for rectifying the output of the power generating unit, wherein the rectifier is configured to output a waveform including a plurality of waves, each wave having an asymmetrical angular shape including a peak portion, a first portion located on one side of the peak portion, and a second portion located on the other side of the peak portion and exhibiting a more rapid change in the amount of an output voltage than a change in the amount of the first portion, and the control module is configured to control the load to be turned on or off at a time of shifting of the waveform output from the rectifier from the peak portion toward the first portion of a wave by a predetermined amount. With this configuration, it is possible to prevent operation of the load from becoming unstable due to an insufficient amount of power being supplied to the load in a wider range of circumstances, thereby reducing the likelihood the operational load will become unstable during operation.

A vehicle according to a second aspect of the present invention is a vehicle which includes the above-described engine control system. With this configuration, it is possible to construct a vehicle including an engine control system which is capable of preventing operation of the load from becoming unstable.

DETAILED DESCRIPTION

Embodiments of the present invention will be described hereinafter based on the drawings.

Figure 1:
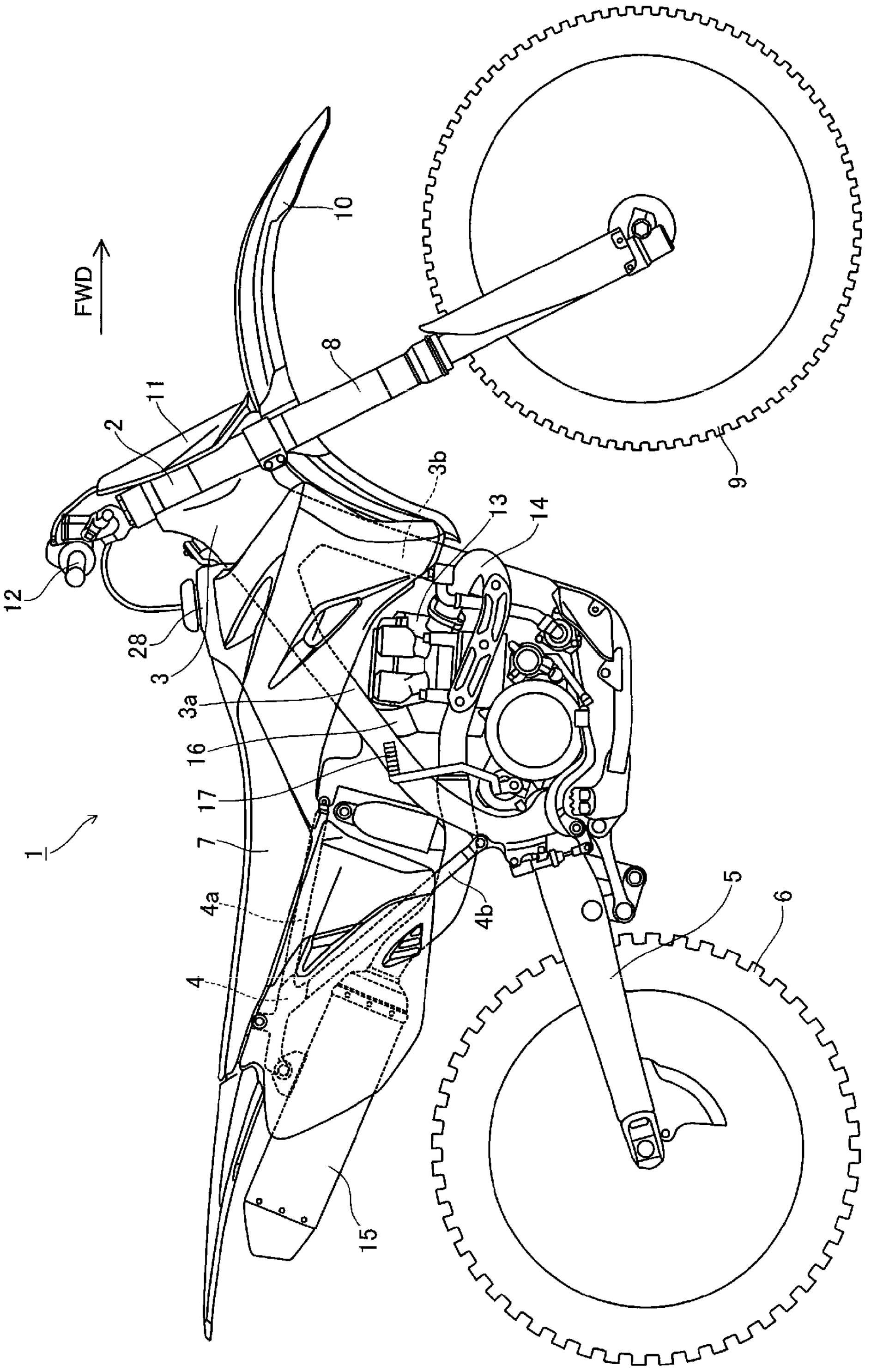
FIG. 1 is a side view showing a motorcycle according to an embodiment of the present invention.

FIG. 1 is a side view showing a motorcycle 1 according to an embodiment of the present invention. FIGS. 2 to 7 are drawings illustrating the structure and operation of the motorcycle shown in FIG. 1. In the figures, the direction of the arrow FWD indicates the "front side" in the travelling direction of the motorcycle.

As shown in FIG. 1, a main frame 3 is disposed at a rear side of a head pipe 2. Further, the main frame 3 has an upper frame portion 3*a* which extends rearward from the upper side and a lower frame portion 3*b* which extends rearward from the lower side. Further, an upper frame portion 4*a* and a lower frame portion 4*b* of a rear frame 4 are respectively connected to the center part and the rear part of the upper frame portion 3*a* of the main frame 3. The head pipe 2, the main frame 3, and the rear frame 4 form a body frame.

Further, a pivot shaft (not shown) is disposed at the rear of the upper frame portion 3*a* of the main frame 3. A rear arm 5 is supported at its front end by the pivot shaft so as to be able to pivot in the vertical direction. A rear wheel 6 is rotatably coupled to the rear end of the rear arm 5. A fuel tank 28 is arranged above the upper frame portion 3*a* of the main frame 3. A seat 7 is arranged at the rear side of the fuel tank 28.

Furthermore, a front fork 8 having suspension for absorbing impact in the vertical direction is rotatably mounted to the head pipe 2 so as to operably extend below the head pipe 2. A front wheel 9 is rotatably coupled to the bottom end of front fork 8. A front fender 10 is arranged above the front wheel 9. A number plate 11 to cover the front side of the head pipe 2 is disposed at the front side of the head pipe 2. A handle 12 is rotatably disposed above the head pipe 12.

In addition, an engine 13 is mounted below the upper side frame portion 3*a* of the main frame 3. An exhaust pipe 14 is attached to a front portion of the engine 13. The exhaust pipe 14 extends rearward and is connected to a muffler 15. An intake pipe 16 is attached to a rear portion of the engine 13.

In the present embodiment, a kick pedal 17 for starting the engine 13 with a user's foot is attached to a rear portion of the engine 13. Here, the kick pedal 17 is an example of a "manual start device" of the present invention. A function of kick pedal 17 is to drive a generator 37 (FIG. 2), which is described later, by being rotated downward with a user's foot at the time of starting the engine 13.

Figure 2:
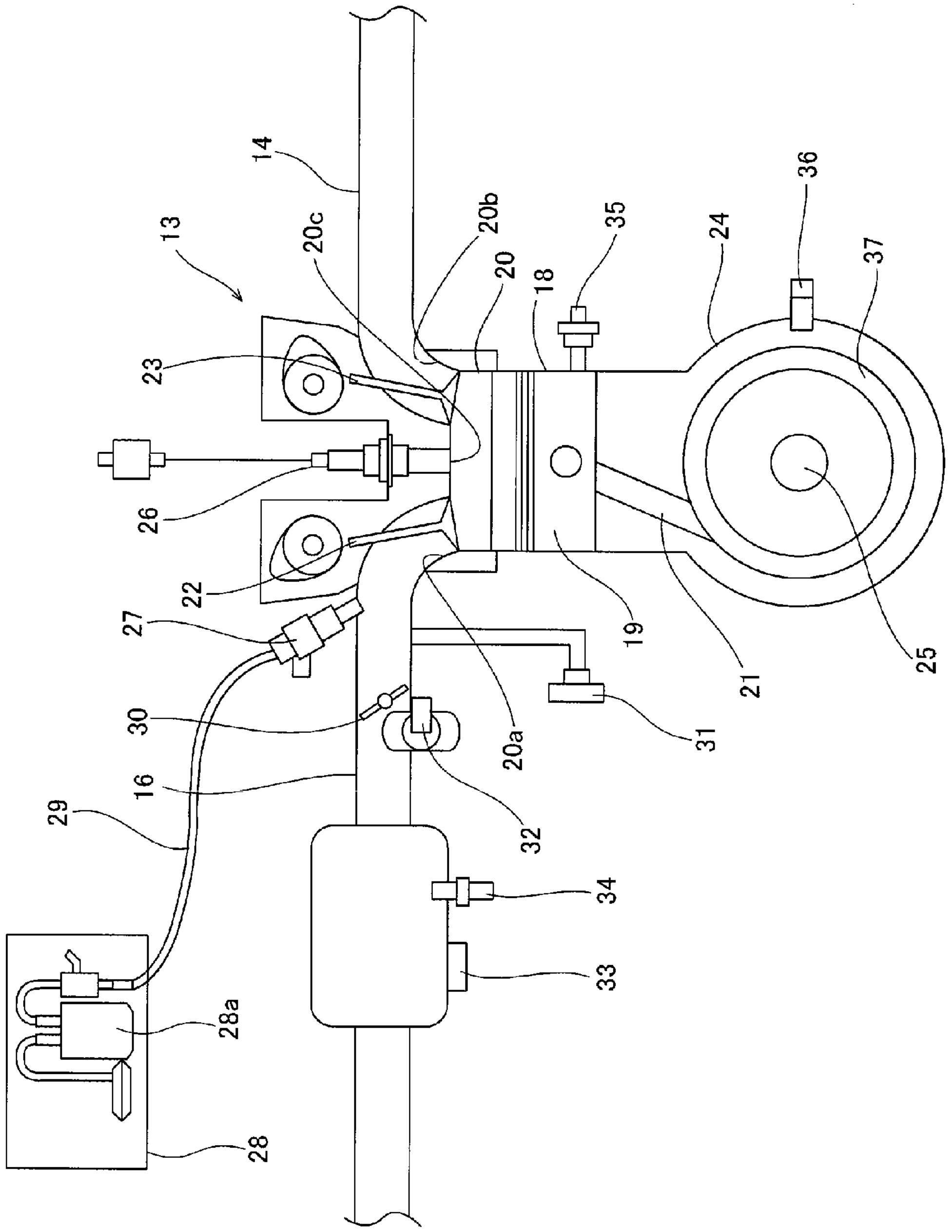
FIG. 2 is a schematic diagram illustrating structure disposed in the vicinity of the engine of the motorcycle shown in FIG. 1.

As shown in FIG. 2, a cylinder 18, a piston 19, which slides vertically inside the cylinder 18, and a cylinder head 20, which is arranged at the upper portion of the cylinder 18 form part of the engine 13. One end of a connecting rod 21 is rotatably attached to the piston 19. The cylinder head 20 is arranged so as to close one opening of the cylinder 18. An intake port 20*a* and an exhaust port 20*b*, which are provided above the cylinder 18, are formed in the cylinder head 20. An intake valve 22 and an exhaust valve 23 are disposed in the intake port 20*a* and the exhaust port 20*b*, respectively. Furthermore, a combustion chamber 20*c* is formed in a portion of the cylinder 18, one opening of which is closed by the lower part of the cylinder head 20. The intake port 20*a* is used to supply a mixture of air and fuel to the combustion chamber 20*c*. An intake pipe 16 is connected to the intake port 20*a*. The exhaust port 20*b* is provided to discharge residual gases after combustion from the combustion chamber 20*c*.

The exhaust pipe 14 is connected to the exhaust port 20*b*. A crankcase 24 is arranged below the cylinder 18, and a crankshaft 25 is arranged in the crankcase 24. The other end of the connecting rod 21 is rotatably attached to the crankshaft 25. The crankshaft 25 is configured to be rotatable by the movement of the connecting rod 21 in accordance with the vertical sliding of the piston 19 inside the cylinder 18. Further, an ignition plug 26 which ignites the mixture of air and fuel is operatively disposed in the cylinder head 20. It is to be noted that the ignition plug 26 is an example of a "load" according to the present invention.

In the present embodiment, the engine 13 is a four-stroke engine comprising an intake stroke, a compression stroke, a combustion (power) stroke and an exhaust stroke in accordance with the vertical sliding movement of the piston 19. Specifically, in the intake stroke, the engine 13 is configured so that the intake port 20*a* is opened and the air and fuel mixture flows into the combustion chamber 20*c* when the piston 19 slides downward and the intake valve 22 is lifted by a cam lobe. Further, the piston 19 is configured to slide down to the intake bottom dead center which is the bottom dead center of the cylinder 18.

Moreover, the engine 13 is configured so that in the compression stroke the intake port 20*a* is closed by the intake valve 22 and the air and fuel mixture in the cylinder 18 is compressed when the piston 19 slides upward from the intake bottom dead center. At this time, piston 19 is configured to slide up to the compression top dead center which is the top dead center of the cylinder 18.

The engine 13 is configured so that in the combustion stroke the air and fuel mixture, which is compressed by the piston 19 having arrived at the compression top dead center, is ignited with a spark generated by the ignition plug 26 at which point fuel combustion occurs. Thereafter, the piston 19 slides downward from the compression top dead center. At this time, the piston 19 is configured to slide down to the combustion bottom dead center, which is the bottom dead center of the cylinder 18 due to the combustion of the air and fuel mixture which is expanded due to the combustion of the fuel.

The engine 13 is configured so that in the exhaust stroke the exhaust port 20*b* is opened as the exhaust valve 23 is lifted by a cam lobe when the piston slides upward from the combustion bottom dead center. In addition, the engine 13 is configured so that the combustion gas in the combustion chamber 20*c* is exhausted through the exhaust port 20*b* by being pushed out upward by the piston 19. The piston 19 is configured to slide up to the exhaust top dead center which is the top dead center of the cylinder 18.

In the present embodiment, an injector 27, which injects fuel to the upstream side of the intake port 20*a* by an amount calculated by an ECU 38 (to be described later), is arranged at the intake pipe 16 (FIG. 2). It is to be noted that the injector 27 is an example of a "load" and a "fuel injection device" according to the present invention, as other fuel injection devices may be used and other loads may be included in the engine control system. A fuel pump 28*a*, which supplies the fuel from fuel tank 28 to the injector 27, is connected to the injector 27 via a hose 29. The injector 27 is configured to inject fuel by opening a solenoid valve (not shown). The injector 27 is powered by electric power output from a regulator 39 (see FIG. 3), to be described later. It is to be noted that the amount of fuel injected by the injector 27 is controlled according to the amount of time the solenoid valve stays opened. The opening/closing speed of this valve varies according to the amount of power supplied to the injector 27. Specifically, if voltage supplied to the injector 27 is sufficient, the solenoid valve opens quickly. If the voltage supplied to the injector 27 is insufficient, the solenoid valve opens slowly. The injector 27 is configured to inject the fuel by a lesser amount than the injection amount of fuel calculated by the ECU 38, to be described later. Due to this, if the amount of the power supplied to the injector 27 is insufficient, the injector 27 may possibly not function normally. Further, a throttle valve 30 which opens and closes to adjust the flow rate of air flowing into the intake port 20*a* is disposed within the intake pipe 16 upstream from injector 27.

A pipe pressure sensor 31, which detects air pressure in the intake pipe 16, a throttle position sensor 32, which detects the extent of the opening of the throttle valve 30, an atmospheric pressure sensor 33, which detects atmospheric pressure, and an atmospheric temperature sensor 34, which detects atmospheric temperature, are operatively coupled to the intake pipe 16. Further, a water temperature sensor 35, which detects water temperature in a water jacket (not shown) which cools the cylinder 18 with coolant, and a crank angle sensor 36, which detects the rotational position of the crankshaft 25, are arranged in the engine 13. The later-mentioned ECU (Engine Control Unit) 38 (see FIG. 3) is configured to control the amount of the fuel injected by the injector 27 based on the detection signals received from pipe pressure sensor 31, the throttle position sensor 32, the atmospheric pressure sensor 33, the atmospheric temperature sensor 34, the water temperature sensor 35 and the crank angle sensor 36. Here, the crank angle sensor 36 is an example of a "sensor module" for use in accordance with the present invention, as other sensor modules may also be used.

Figure 4:
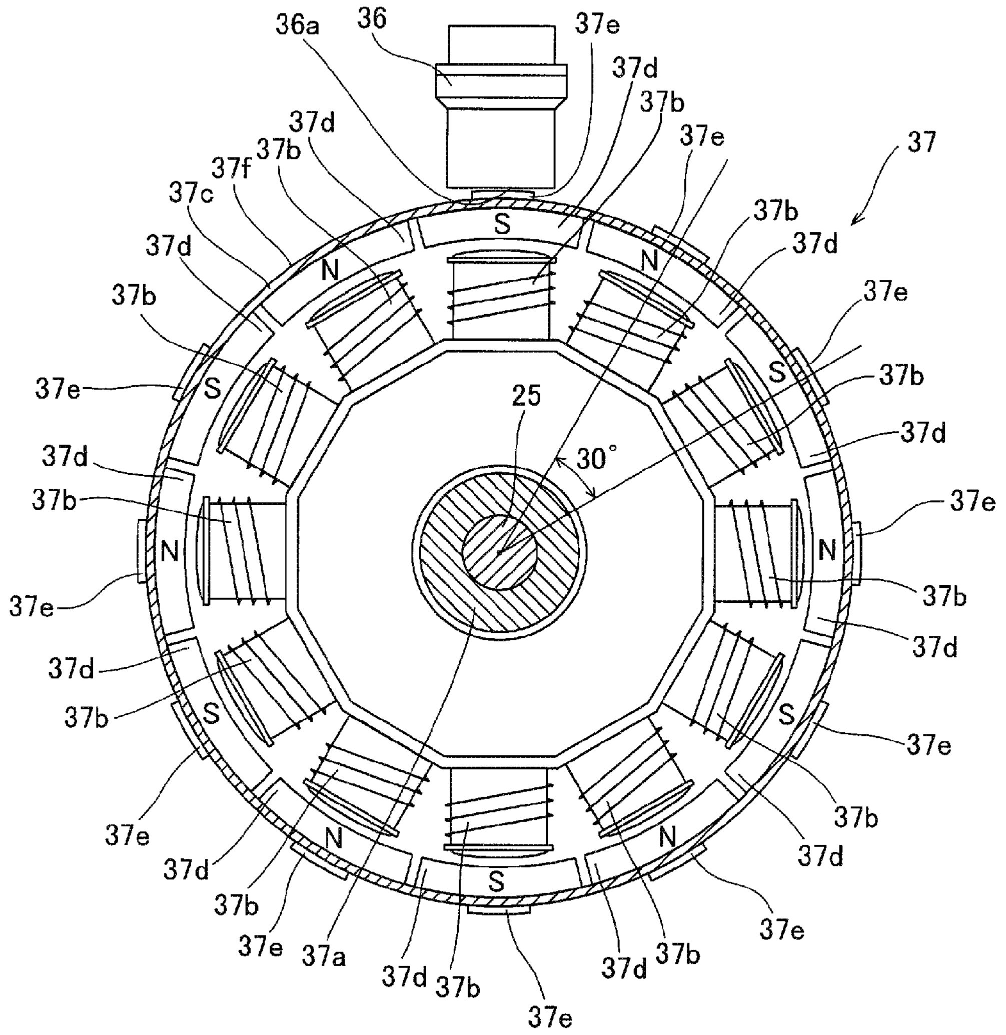
FIG. 4 is a cross-sectional view showing the structure of a generator of the motorcycle shown in FIG. 1.

In the present embodiment, the generator 37, which is operated in accordance with the rotation of the crankshaft 25, is disposed inside the crankcase 24, as shown in FIG. 2. It is to be noted that the generator 37 is an example of a "power generating unit" according to the present invention, as other power generation units may also be used. The generator 37 is configured to supply power to the ignition plug 26, the injector 27, and the fuel pump 28*a*. As shown in FIG. 4, the generator 37 has a core portion 37*a*, which is annular in cross-section and which is disposed on the outside of crankshaft 25, twelve coil portions 37*b* disposed at about every 30° relative to the core portion 37*a* (as shown in FIG. 4), a flywheel 37*c*, which is disposed outside the coil portions 37*b*, twelve magnets 37*d* disposed at the inner face of the flywheel to correspond to the twelve coil portions 37*b*, and eleven projecting portions 37*e* which are disposed at about a 30° pitch (angle between neighboring bisectors) so as to face eleven of the magnets 37*d* and thereby sandwich the flywheel 37*c* there between. It is to be noted that since no battery is mounted in the motorcycle 1 (see FIG. 1) according to the present embodiment, the power necessary to start and drive the engine 13 (see FIG. 2) is directly supplied from the generator 37.

Further, in the present embodiment, the flywheel 37*c* is arranged concentrically with the core portion 37*a*. Since the core portion 37*a* is fixed to the crankcase 24 (see FIG. 2), the core portion 37*a* and the coil portions 37*b* are configured not to rotate. On the other hand, the flywheel 37*c* is configured to rotate with the crankshaft 25. Therefore, the flywheel 37*c*, the magnets 37*d*, and projecting portions 37*e* are configured to rotate with the rotation of the crankshaft 25. The generator 37 is an alternating current (AC) generator outputting AC voltage. The projecting portions 37*e* are provided for detection of the rotational angle position and rotational speed of the crankshaft 25. Specifically, a pulse (crank pulse signal shown in FIG. 5), which is generated when a projecting portion 37*e* passes by the detection surface 36*a* of the crank angle sensor 36 (see FIG. 5), is detected by ECU 38 (see FIG. 3), to be described later. Projecting portions 37*e* rotate in accordance with the rotation of the flywheel 37*c*.

An extended gap portion 37*f*, having an angular width of about 60° is provided on the outside of the flywheel 37*c* by omitting one projecting portion 37*e* opposite one magnet 37*d*. The ECU 38 (see FIG. 3) is configured to determine that the crankshaft 25 has passed a reference rotation position (FIG. 5) when the extended gap portion 37*f* passes by detection surface 36*a* of the crank angle sensor 36. The ECU 38 is also configured to detect the rotational angle and speed of crankshaft 25 based on the number and rate of crank pulse signals detected thereafter from crank angle sensor 36 (see FIG. 5).

Figure 3:
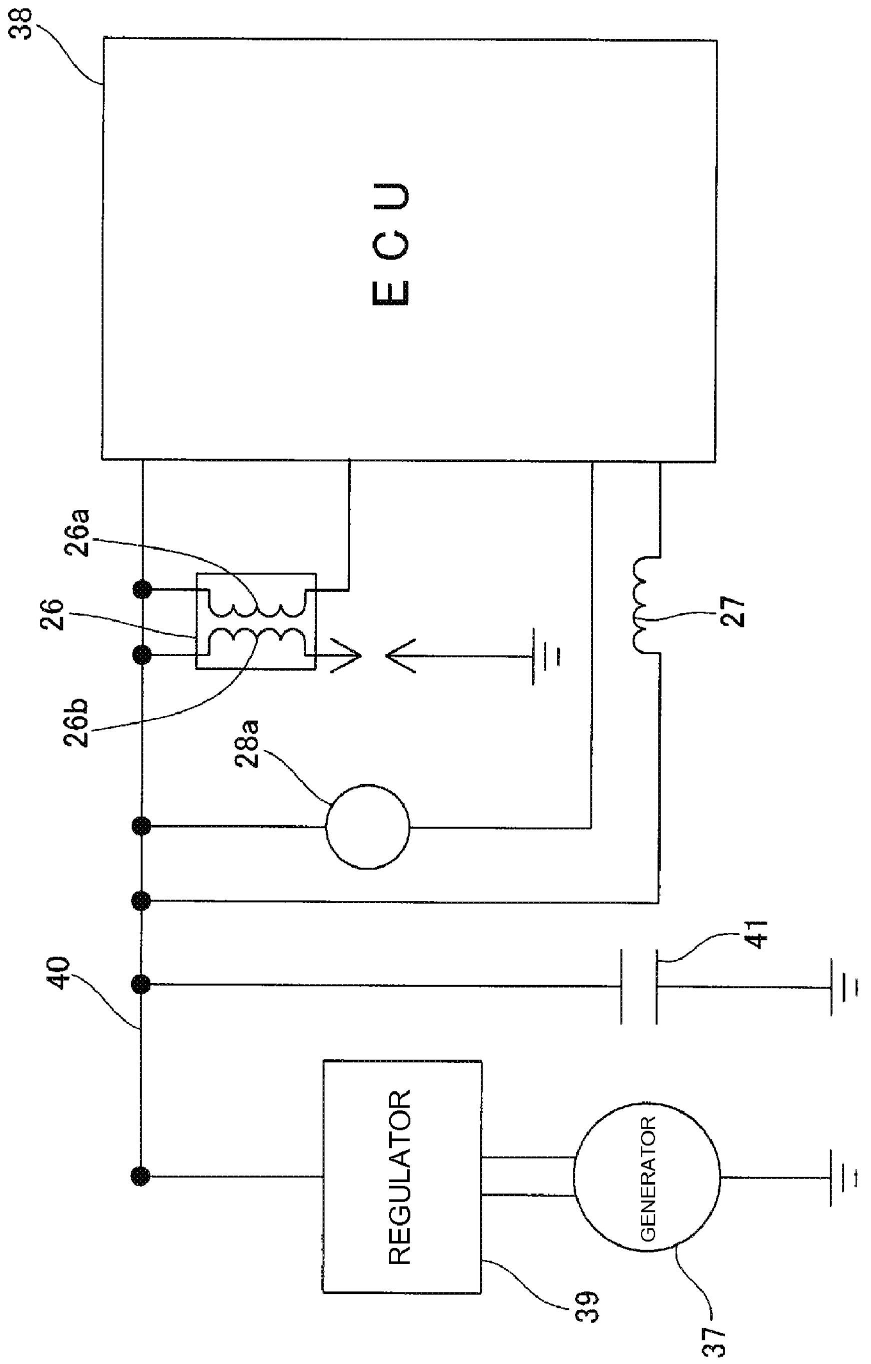
FIG. 3 is a block diagram showing a circuit configuration of the motorcycle shown in FIG. 1.

In the present embodiment, the ECU 38 is electrically connected to the generator 37, as shown in FIG. 3. Specifically, a regulator 39 is electrically connected to the generator 37, and the regulator 39 is connected to the ECU 38 via wiring 40. A capacitor 41 having one end grounded is connected to the wiring 40. The ECU 38 is thereby arranged so that the voltage generated by the generator 37 is rectified by the regulator 39 and stabilized and supplied by the capacitor 41. Here, the ECU 38 is an example of a "control module" according to the present invention and the regulator 39 is an example of a "rectifier" according to the present invention.

Figure 5:
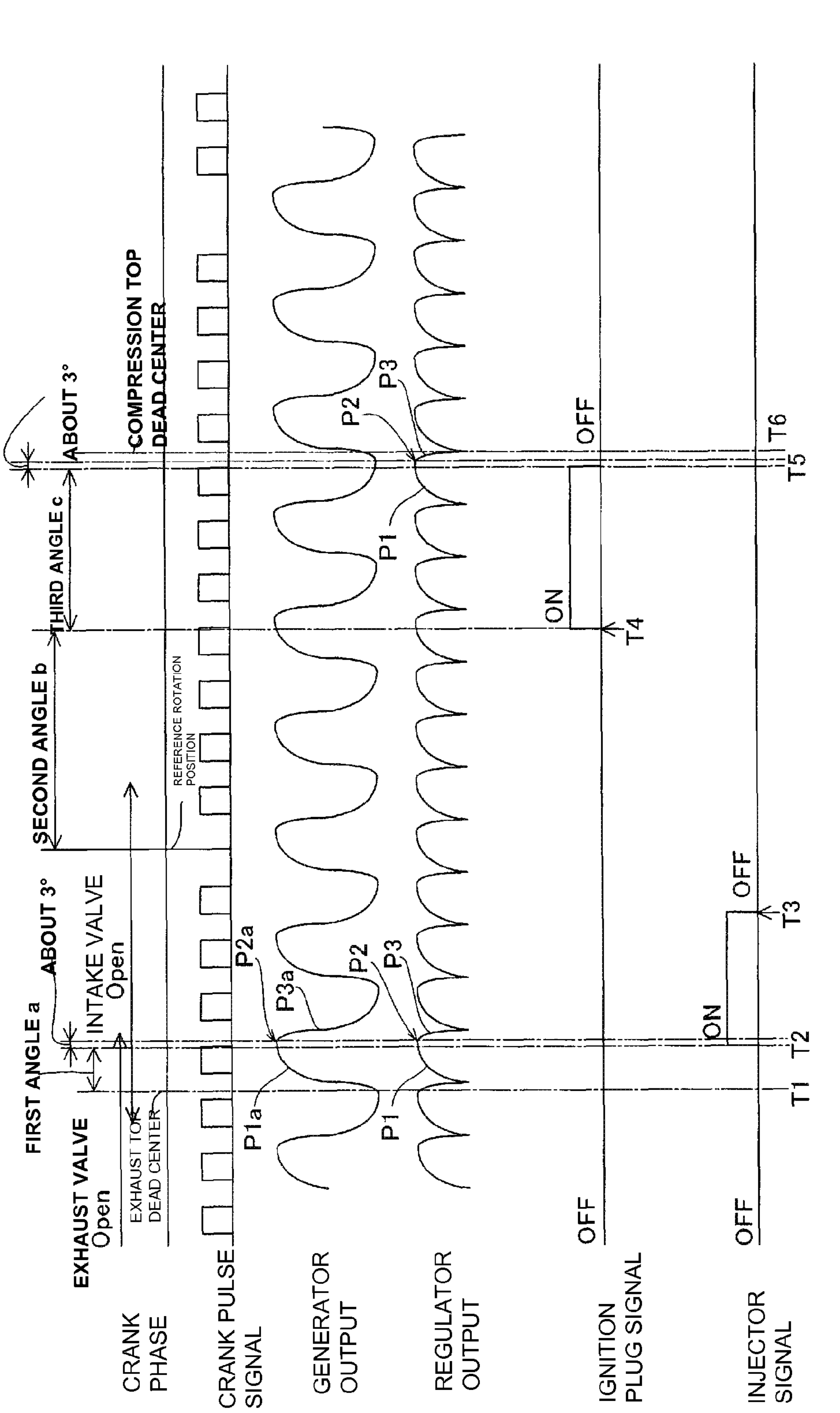
FIG. 5 is a timing chart of the operation of the motorcycle shown in FIG. 1.

Furthermore, in the present embodiment, as shown in FIG. 5, the regulator 39 functions to rectify the AC voltage output from the generator 37 to a direct current (DC) voltage and to invert the portion of the voltage waveform output from generator 37 below the amplitude center line of the waveform. Namely, the regulator 39 is a full-wave rectifier. Further, the regulator 39 and generator 37 are configured so that the waveform of the voltage output from the regulator 39 corresponds to the pulse (crank pulse signal shown in FIG. 5) detected by the crank angle sensor 36 (FIG. 2).

Figure 6:
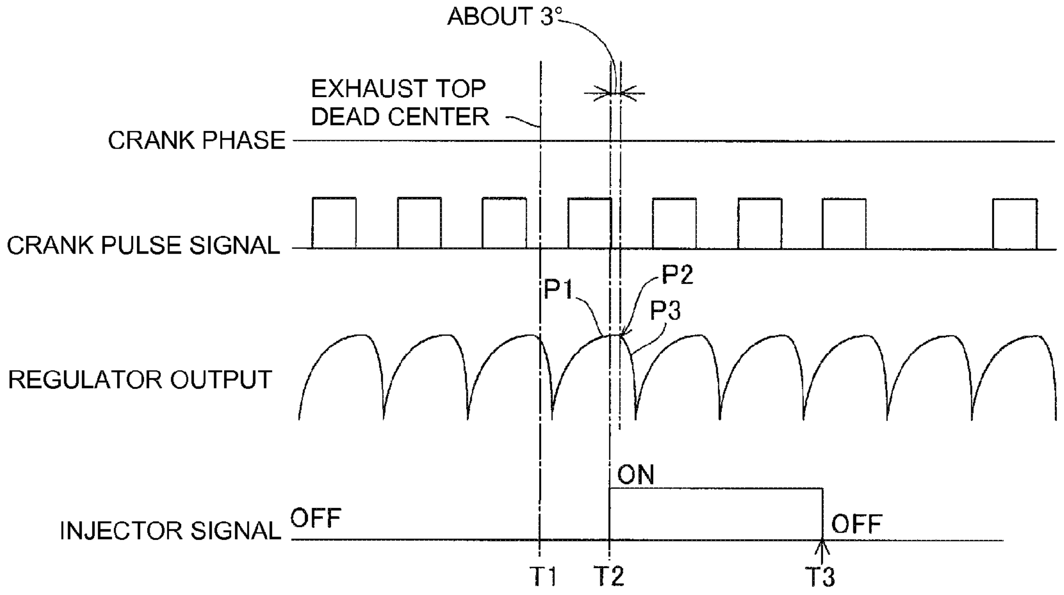
FIG. 6 is a timing chart highlighting portions of the timing chart in FIG. 5 for purposes of illustrating an injector control operation performed by the motorcycle of FIG. 1.
Figure 7:
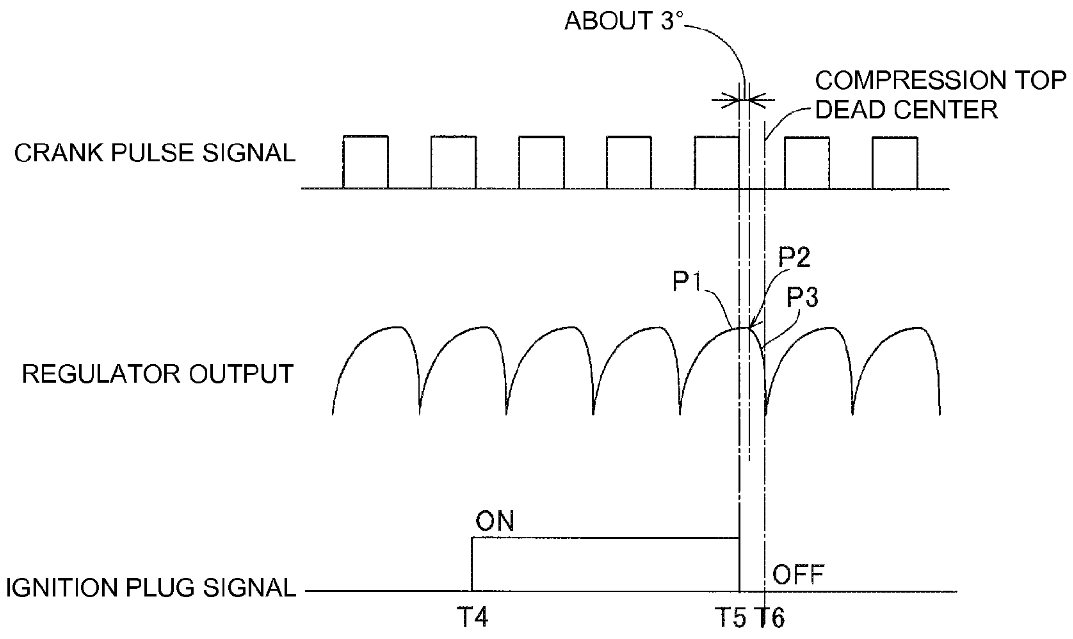
FIG. 7 is a timing chart highlighting portions of the timing chart of FIG. 5 for purposes of illustrating an ignition plug control operation performed by the motorcycle of FIG. 1.

As shown in FIG. 6, the regulator 39 is configured so that the waveform of the voltage output from the regulator 39 includes a plurality of asymmetrical angular shaped waves including a peak portion P2, a first portion P1 located on one side of the peak portion P2, and a second portion P3 located on the other side of the peak portion P2, whereby the rate of voltage change in the second portion P3 is greater than that of first portion P1. The rate of change in voltage in the first portion P1 is configured so as to result in a smooth inclining curve with a slowly decreasing slope while the rate of change in voltage in the second portion P3 is configured so as to result in a sharply declining curve with rapidly increasing slope so that the second portion P3 has a sharper waveform curve than that of the first portion P1. Further, in the present embodiment, the voltage output by the regulator 39 is configured so that the first waveform portion P1, the peak portion P2, and the second waveform portion P3 appear in this order.

As shown in FIG. 5, the waveform portion of the voltage output by generator 37, which corresponds to the waveform that is not rectified by the regulator 39, includes waves having an asymmetrical angular shape substantially identical to that of the waveform of the voltage output by the regulator 39. Namely, the waveform of the voltage output from the generator 37 includes a first portion P1*a* having a gentle change in voltage, a peak portion P2*a*, and a second portion P3*a* having a sharp change in voltage.

As shown in FIG. 3, one terminal of each of the ignition plug 26, the injector 27, and the fuel pump 28*a* is electrically connected to the generator 37 and the regulator 39 via the wiring 40. The other terminal of each of the ignition plug 26, the injector 27, and the fuel pump 28*a* is connected to the ECU 38. The ECU 38 can thereby control the operation of the ignition plug 26, the injector 27, and the fuel pump 28*a* by controlling the supply of power from the generator 37. Further, the ignition plug 26 includes a primary coil 26*a* and a secondary coil 26*b*. The ignition plug 26 is configured to give off sparks by generating high voltage on the secondary coil 26*b* according to a current change in the primary coil 26*a* when current applied from the generator 37 to the primary coil 26*a* is cut off. In this case, if the change in the amount of the current applied to the primary coil 26*a* is sufficiently large, the ignition plug 26 will give off sparks. If the change in the amount of the current applied to the primary coil 26*a* is insufficient, the ignition plug 26 will not give off sparks.

Moreover, in the present embodiment, the ECU 38 is configured to decide the timing of controlling the ignition plug 26 and the injector 27 to be turned on or off based on the rotational angle position of the crankshaft 25 detected by the crank angle sensor 36. Specifically, the ECU 38 is configured to determine the timing of controlling the ignition plug 26 and the injector 27 to be turned on or off based on the pulse (see FIGS. 5 to 7) detected by the crank angle sensor 36 whenever the crankshaft 25 rotates by about 30°.

Further, in the present embodiment, as shown in FIG. 5, the ECU 38 is configured to control the injector 27 to be turned on to open the solenoid valve to the injector 27 at timing T2 if the crankshaft 25 has rotated by a first angle a since timing T1 at which the piston 19 (see FIG. 2) reaches the exhaust top dead center. As shown in FIG. 6, this timing T2 occurs about 3° before the rotational angle position of the crankshaft 25 when the waveform of the output from the regulator 39 reaches the peak portion P2. As shown in FIGS. 5 and 6, the ECU 38 is configured to control the injector 27 to be turned off at timing T3 after the crankshaft 25 rotates by a predetermined angle.

Moreover, in the present embodiment, as shown in FIG. 5, the ECU 38 is configured to control the ignition plug 26 to be turned on by supplying power to the primary coil 26*a* of the ignition plug 26 at timing T4 if it is determined that the crankshaft 25 has rotated by a second angle b since detection of the reference rotational position of the crankshaft 25. The ECU 38 is configured to control the ignition plug 26 to be turned off by cutting supply of current to the primary coil 26*a* at timing T5 if the crankshaft 25 has rotated by a third angle C since the timing T4. This timing T5 is about 3° before the rotational angle position of the crankshaft 25 when the waveform of the output from the regulator 39 reaches the peak portion P2. With this configuration, before the piston 19 reaches the compression top dead center (timing T6 in FIG. 5), the ignition plug 26 gives off sparks into the combustion chamber 20*c* of the engine 13 (see FIG. 2).

As stated above, in the present embodiment, if the waveform of the output from the regulator 39 has the asymmetrical angular shape including the peak portion P2, the first portion P1 located on a front (left) side of the peak portion P2 and having the gentle change in voltage, and the second portion P3 located on a rear (right) side of the peak portion and having the sharp change in voltage, the ECU 38 is configured to control the injector 27 to be turned on and the ignition plug 26 to be turned off at the timings T2 and T5, respectively. Timings T2 and T5 are each shifted from the peak portion P2 of the waveform of the output from the regulator 39 toward the first portion P1 side (front side) by about a 3° shift of the rotational angle of the crankshaft 25. With this configuration, even if the position of the peak portion P2 of the waveform of the output from the regulator 39 is shifted toward the first portion P1 side or the second portion P3 side due to, for example, manufacturing error of the generator 37 or the regulator 39, the timings T2 and T5, at which the injector 27 is controlled to be turned on and the ignition plug 26 is controlled to be turned off, respectively, would shift toward the first portion P1 side or the second portion P3 side correspondingly, with the first portion P1 having the gentle change in voltage. With this arrangement, it is, therefore, possible to prevent the voltage from being reduced when the injector 27 is controlled to be turned on and the ignition plug 26 is controlled to be turned off. It is thereby possible to prevent operations performed by the injector 27 and the ignition plug 26 from becoming unstable due to the insufficient supply of power.

As stated above, in the present embodiment, the crank angle sensor 36 is capable of detecting the rotational position of the crankshaft 25 by the pulse generated whenever the crankshaft 25 rotates by about 30°, and the waveform of the output from the regulator 39 is configured to correspond to the rotational position of the crankshaft 25. Further, the ECU 38 is configured to control the injector 27 to be turned on and the ignition plug 26 to be turned off based on the rotational position of the crankshaft 25 detected by the crank angle sensor 36, and to control the injector 27 to be turned on and the ignition plug 26 to be turned off at the timings of shifting of the rotational position of the crankshaft 25 from the peak portion P2 of the waveform of the output from the regulator 39 toward the first portion P1 side (front side) by about 3°. The ECU 38 can thereby readily control the injector 27 to be turned on and the ignition plug 26 to be turned off at the timings shifted from the peak portion P2 of the waveform output from the regulator 39 toward the first portion P1 side (front side) by about 3°.

As stated above, in the present embodiment, the ECU 38 is configured to control the injector 27 to be turned on and the ignition plug 26 to be turned off at the timings T2 and T5 which are near the peak portion P2 and are shifted from the peak portion P2 of the waveform of the output from the regulator 39 toward the first portion P1 side (front side) by about 3°, respectively. The ECU 38 can thereby control the injector 27 to be turned on and the ignition plug 26 to be turned off at a voltage value that is not significantly different from the voltage value of the peak portion P2 of the waveform of the output from the regulator 39.

As stated above, in the present embodiment, the regulator 39 is implemented as a full-wave rectifier, whereby the portion of the AC voltage output from the generator 37 below the center line of the amplitude is inverted for use as DC voltage. Therefore, as compared with a half-wave rectifier that does not use the portion of the waveform of the AC voltage below the amplitude center line, the regulator 39 can rectify the AC voltage supplied from the generator 37 to DC voltage while reducing loss generated during rectification.

The embodiments disclosed herein are to be considered to be illustrative in all respects and not to be restrictive. The scope of the present invention is indicated not by the above-stated description of the embodiment but by the claims. Furthermore, equivalents of the claims and all modifications within the scope of the claims are included within the present invention.

For example, in the above-described embodiment, an example in which the vehicle according to the present invention is applied to a motorcycle has been shown. However, the invention is not limited to this embodiment but is also applicable to other vehicles such as motor vehicles, tricycles and ATVs (All Terrain Vehicles).

Moreover, in the above-described embodiment, an example in which application of the vehicle to an off-road motorcycle has been shown. However, the invention is not limited to this embodiment but is also applicable to on-road motorcycles and vehicles.

In the above-described embodiment, an example of the application of the engine control device according to the present invention to the engine of a motorcycle that is the vehicle has been shown. However, the present invention is not limited to this embodiment but is also applicable to other engines, such as engines for generators, chainsaws or the like, including a load and a power generating unit.

In the embodiment, an example of application of the present invention to a motorcycle that does not include a battery has been shown. However, the present invention is not limited to this embodiment but is also applicable to motorcycles including a battery. In this case, even if the battery is discharged, starting performance of the motorcycle can be improved by applying the present invention at the time of starting the motorcycle.

In the embodiment, an example of configuring a control module to control an injector to be turned on and an ignition plug to be turned off at the timings of the rotational position of the crankshaft about 3° before the peak portion has been shown. However, the present invention is not limited to this embodiment. The control module may execute only one of the ON-control over the injector and the OFF-control over the ignition plug at the timing of the rotational position of the crankshaft being shifted from the peak portion P2 by about 3° toward the first portion P1 having the gentle voltage change.

Moreover, the control module may be configured to control the injector to be turned on and the ignition plug to be turned off at timing of shifting the rotational position of the crankshaft by about 3° or more or less than about 3° within a shifting width of the position of the peak portion considered to be generated by manufacturing error. Further, the present invention is applicable to an alternative instance in which the waveform of the output from the regulator includes a part (a front part) having a sharp change in output value, a peak portion, a part (a rear part) having a gentle change in output value arranged in this order. In such case, it suffices to control the injector to be turned on and the ignition plug to be turned off at a timing at which the rotational position of the crankshaft is shifted from the peak portion toward the rear side by a predetermined angle (for example, about 3°).

In the embodiment above, the fuel injector and the load have been mentioned as an example of loads controlled by the ECU to be turned on or off. However, the present invention is not limited to this embodiment but is also applicable to other loads used to control driving of the engine.

It is to be clearly understood that the above description was made only for purposes of an example and not as a limitation on the scope of the invention as claimed herein below.

What is claimed:

1. An engine control module for controlling the operation of a load to be powered by a rectified output from a power generator driven by a rotating crankshaft, the rectified output having a waveform which includes a plurality of waves, each wave including a peak portion, a first portion located on one side of the peak portion, and a second portion located on the other side of the peak portion, the second portion of the wave exhibiting a more rapid change in voltage than the first portion in the vicinity of the peak portion, the engine control module being configured to turn at least a portion of the load on or off at a first timing corresponding to a shift in waveform output from the peak portion toward the first portion of a first wave, the waveform shift corresponding to a predetermined angular shift in the rotational position of the crankshaft.

2. An engine control method, the method comprising the steps of:

driving a power generator with a rotating crankshaft to produce an output signal;

rectifying the output signal from the power generator to produce a rectified waveform which includes a plurality of waves, each wave including a peak portion, a first portion located on one side of the peak portion, and a second portion located on the other side of the peak portion, the second portion of the wave exhibiting a more rapid change in voltage than the first portion in the vicinity of the peak portion; and controlling the supply of the rectified output to a load by turning at least a portion of the load on or off at a first timing corresponding to a shift in the waveform output from the peak portion toward the first portion of a first wave, the waveform shift corresponding to a first predetermined angular shift in the rotational position of the crankshaft.

3. The engine control method of claim 2, further comprising the step of detecting the rotational position of the crankshaft, wherein the controlling step is performed on the basis of detected rotational position of the crankshaft.

4. A control system for an engine having a crankshaft, the control system comprising:

a power generating unit arranged to be driven by the crankshaft;

a load electrically coupled to the power generating unit;

a control module electrically coupled to the power generating unit and the load, the control module configured to control the operation of the load; and a rectifier electrically interposed between the power generating unit and the load for rectifying the output from the power generating unit, wherein a waveform output from the rectifier includes a plurality of waves, each wave having a peak portion, a first portion located on one side of the peak portion, and a second portion located on the other side of the peak portion, the second portion of the wave exhibiting a more rapid change in voltage than the first portion in the vicinity of the peak portion, and the control module is configured to turn at least a portion of the load on or off at a first timing corresponding to a shift in the waveform output from the peak portion toward the first portion of a first wave, the waveform shift corresponding to a first predetermined angular shift in the rotational position of the crankshaft.

5. The engine control system of claim 4, wherein the waveform output from the rectifier is configured so that the first portion occurs before the peak portion and the second portion occurs after the peak portion.

6. The engine control system of claim 4, wherein the rectifier is a full-wave rectifier.

7. The engine control system of claim 4, wherein a portion of the power waveform output by the power generating module is substantially identical to the waveform output from the rectifier.

8. The engine control system of claim 4, wherein the predetermined angular shift is about 3°.

9. A vehicle comprising the engine control system of claim 4.

10. The engine control system of claim 4, wherein the load includes a fuel injector, and the control module is configured to turn on the supply of power to the fuel injector at the first timing.

11. The engine control system of claim 10, wherein the opening/closing speed of the fuel injector varies according to the amount of power supplied to the injector.

12. The engine control system of claim 4, further comprising a sensor module for detecting the rotational position of the crankshaft, wherein the control module controls the operation of the load based on the rotational position of the crankshaft detected by the sensor module.

13. The engine control system of claim 12, wherein the waveform output from the rectifier corresponds to the rotational position of the crankshaft.

14. The engine control system of claim 12, wherein the sensor module is configured to generate a pulse whenever the crankshaft rotates by a predetermined angle.

15. The engine control system of claim 14, wherein the waveform output from the rectifier corresponds to a pulse train generated by the sensor module.

16. The engine control system of claim 4, wherein the load includes an ignition plug for giving off sparks in an engine combustion chamber when the supply of power output from the power generating unit is turned off, and the control module is configured to turn off the supply of power to the ignition plug at the first timing.

17. A vehicle comprising the engine control system of claim 16.

18. The engine control system of claim 16, wherein the load includes a fuel injector, and the control module is configured to control the supply of power output from the power generating unit to the fuel injector device.

19. The engine control system of claim 18, wherein the control module is configured to turn on the fuel injector at a second timing corresponding to a shift in the waveform output from the peak portion toward the first portion of a second wave, the waveform shift corresponding to the predetermined angular shift in the rotational position of the crankshaft.

20. A vehicle comprising the engine control system of claim 19.

21. The engine control system of claim 19, wherein the predetermined angular shift is about 3°.

22. The engine control method of claim 21, wherein the rectified waveform is generated such that the first portion occurs before the peak portion and the second portion occurs after the peak portion.

23. The engine control method of claim 22, wherein the rectified waveform corresponds to a pulse train generated by a sensor module.

* * * * *